United States Patent [19]

Sangster et al.

[11] 4,208,376
[45] Jun. 17, 1980

[54] WATER TREATMENT CHEMICAL DISPENSER WITH CONTROL TUBE

[75] Inventors: Arlon G. Sangster, Sterling, Mass.; John M. Casberg, Cheshire; Joseph J. Tepas, Easton, both of Conn.

[73] Assignee: Olin Corporation, New Haven, Conn.

[21] Appl. No.: 886,216

[22] Filed: Mar. 13, 1978

[51] Int. Cl.² .............................................. B67D 5/22
[52] U.S. Cl. ................................ 422/261; 137/268; 210/169; 222/49; 222/71; 222/133
[58] Field of Search ............... 222/49, 65, 71, 133; 137/101.27, 268, 606; 210/169; 422/261, 276, 278, 281, 282

[56] References Cited

U.S. PATENT DOCUMENTS

| | | | |
|---|---|---|---|
| 3,190,726 | 6/1965 | Rudelick | 422/902 X |
| 3,323,539 | 6/1967 | Schneider et al. | 137/268 |
| 3,356,460 | 12/1967 | King et al. | 23/272 |
| 3,416,897 | 12/1969 | Long et al. | 23/267 |
| 3,442,624 | 5/1969 | Kryzer et al. | 422/902 X |
| 3,485,730 | 12/1969 | Virgil, Jr. | 204/98 |
| 3,507,624 | 4/1970 | Schneider | 137/268 X |
| 3,626,972 | 12/1971 | Lorenzen | 137/268 |
| 3,638,833 | 2/1972 | Lucas | 137/268 X |
| 3,710,817 | 1/1973 | Lorenzen | 137/268 |
| 3,712,511 | 1/1973 | Magnasco | 210/169 X |
| 3,746,170 | 7/1973 | Bloom | 210/198 |
| 3,802,845 | 4/1974 | Tepas, Jr. | 137/268 X |
| 3,846,078 | 11/1974 | Brett | 137/268 X |
| 3,870,471 | 3/1975 | Trepas, Jr. et al. | 137/268 X |

Primary Examiner—Robert J. Spar
Assistant Examiner—Fred A. Silverberg
Attorney, Agent, or Firm—Bruce E. Burdick; Thomas P. O'Day

[57] ABSTRACT

An apparatus for dispensing and dissolving soluble water treatment materials is disclosed. The apparatus has an inlet, an outlet and a housing divided by a wall into an outlet chamber in fluid communication with the outlet and a dissolving chamber in communication with the inlet. A vertically adjustable control tube device for controlling the level of water in the dissolving chamber and an outlet valve device for maintaining the water level in the outlet chamber above the outlet are provided. A support device is provided to hold a plurality of cartridges with their lower ends immersed in the water in the dissolving chamber. A high water level malfunction shut-off valve with or without an indicator can be provided and the inlet flow can be controlled by perpendicular passageways with a rotary valve therebetween. The inlet may be in a wall of the outlet chamber and be isolated from the outlet chamber by an inlet valve mechanism leading to the dissolving chamber.

13 Claims, 6 Drawing Figures

WATER TREATMENT CHEMICAL DISPENSER WITH CONTROL TUBE

This invention relates to a dispenser for water treatment chemicals.

Water treatment dispensers are known which have one or more cartridges which are immersed to a selected depth by suitable adjustments, however these devices generally require adjustment of the vertical cartridge position to regulate immersion depth, and this in turn requires a more complex cartridge design. Since the cartridge is generally an expendable mass-produced container, this involves making the mass-produced item more complex. It has now been determined that it would be better to make the dispenser water level regulable so that the cartridge can be simplified and need not itself be adjusted to vary the feed rate.

Also, it is desirable to have the various inlets, outlets and controls all close to one another to ease operation of the apparatus.

These and other problems are solved by the apparatus of the invention which provides an apparatus for dispensing and dissolving soluble water treatment materials, comprising:

(a) a housing having an upper inlet opening adjacent a top thereof and a lower outlet opening adjacent a bottom thereof;

(b) wall means, within said housing, for dividing said housing into an outlet chamber and a dissolving chamber;

(c) control tube means, having:

(i) a first end indirectly supported by said housing and fluidly communicating with said outlet chamber at a vertically adjustable height above a bottom of said dissolving chamber;

(ii) a second end supported by said wall means and communicating with said dissolving chamber adjacent said bottom; and (iii) a tube portion communicating said first and second ends, for controlling the height of water in said dissolving chamber;

(d) support means, attached to said housing, for supporting and holding at least one cartridge of said soluble material to be dissolved with the lower end of said cartridges disposed in said dissolving chamber immersed to a depth determined by said adjusted height of said first end of said control tube means;

(e) outlet valve assembly means, for automatically allowing fluid communication between said lower outlet opening and said outlet chamber only when said outlet chamber contains a treated water to a height above said lower outlet opening; and (f) inlet valve assembly means, for allowing a selected volume flow rate of water from said upper inlet opening into said dissolving chamber.

The objects and advantages of the invention will be more fully understood by reference to the following detailed description taken in connection with the accompanying drawing in which.

Figure 1:
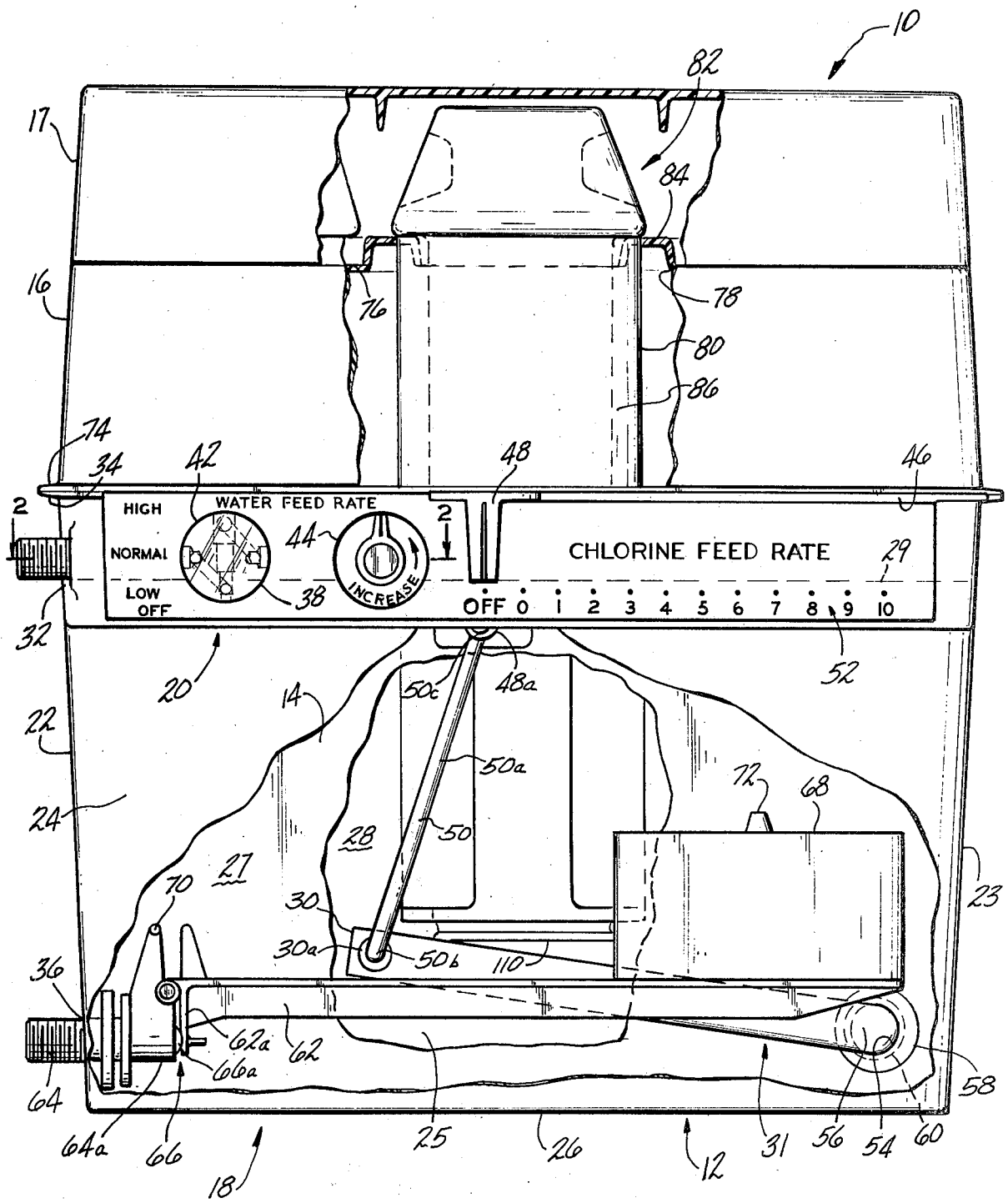
FIG. 1 is a front elevational view of a pool feeder embodying the invention in partial cut-away to show the interior thereof.

FIG. 1 is a front view of a pool feeder 10 with portions removed to show the interior. Pool feeder 10 comprises a housing 12, a partition or wall 14, a cartridge support 16, a cover 17, an outlet valve assembly 18 and an inlet valve assembly 20. Housing 12 is a rectangular open-top box-like structure having four sides 22–25 and a bottom 26 and is made of a chlorine-resistant material such as an injection molded thermoplastic. Wall 14 is a vertical partition dividing housing 12 lengthwise into two chambers, an outlet chamber 27 and a dissolving chamber 28. Wall 14 is formed integral with housing 12 by injection molding of chlorine-resistant plastic and extends upward from bottom 25 to a top 29 at a height preferably above the extreme upper position of the first end 30 of a control tube 31 in chamber 27 to control fluid level within dissolving chamber 28. Housing 12 has an upper inlet opening 32 adjacent a top 34 thereof on a first left side 22 and a lower outlet opening 36 on a first left side adjacent bottom 26. Openings 32 and 36 can be vertically aligned and both pass from the exterior of housing 12 through side 22 into outlet chamber 27. Housing 12 has a flowmeter opening 38 and an inlet valve control opening 40 (see FIG. 2) through a second "front" side 24. A flowmeter 42 and water control knob 44 are accessible through openings 38 and 40, respectively, to the "front" exterior of housing 12 for use thereof. Front side 24 also has a horizontal slot 46 through which a slide control 48 passes to the front exterior of housing 12. Slide control 48 is pivotally connected by a link member 50 to first end 30 of control tube 31. Link member 50 is a rod having a central portion 50a, a lower end 50b and an upper end 50c. Lower end 50b is bent rearward at right angles to central portion 50a and passes radially through first end 30 through a washer 30a and is rotatably pinned to end 30. Upper end 50c is bent forward at right angles to portion 50a and extends across outlet chamber 27 from front to back adjacent to top 34 and is rotatably pinned to a lower end 48a of slide control 48. Front side 24 is provided with a horizontal scale 52 reading from left to right from 0–10 with an "OFF" position to the left of the zero. Slide control 48 can be slid along scale 52 to any desired position, and such position will result in a corresponding position of first end 30 at some height above bottom 26. Slide control 48 serves to vary the chlorine dissolving rate by varying the height of water in dissolving chamber 28. Partition or wall 14 is provided with an opening 54 adjacent bottom 26 near the right side 23 of housing 12. A second end 56 of control tube 31 is bent rearward at right angles to the remainder of tube 31 and passes rearwardly through opening 54 perpendicular to wall 14. Wall 14 includes a dynamic seal 58 disposed between second end 56 and wall 14 to prevent fluid passage between chambers 27 and 28 through opening 54 outside of second end 56. End 56 is rotatably mounted in opening 54 and has a flange 60 or other abutment means within chamber 28 for preventing second end 56 from accidently pulling out of opening 54 during feeder operation. Control tube 31 is an L-shaped tube of chlorine-resistant plastic. Other chlorine-resistant materials could be used for control tube 31.

Outlet valve assembly 18 is a normally closed outlet valve which is opened responsive to the raising of a float arm 62 and comprises float arm 62, outlet conduit 64, outlet valve 66, float 68 and stop 70. Float arm 62 lies within outlet chamber 27 parallel to wall 14 from adjacent left wall 22, where it is hinged to outlet conduit 64, to adjacent right wall 23. Float 68 is a block made of chlorine-resistant float material and is attached to arm 62 by a pin 72 or other means such as a chlorine-resistant adhesive. Arm 62 has a downward projection 62a which passes downwardly adjacent the inlet end 64a of conduit 64. An elastomeric outlet valve member 66a of outlet valve 66 is attached to projection 62a facing a conforming seating surface on inlet end 64a so that when float arm 62 is lowered inlet end 64a of outlet conduit 64 is closed and fluid is prevented from leaving outlet chamber 27 through outlet opening 36. Downward movement of arm 62 is limited by the seating of outlet valve member 66a on the inlet 64a of outlet conduit 64.

Figure 5:
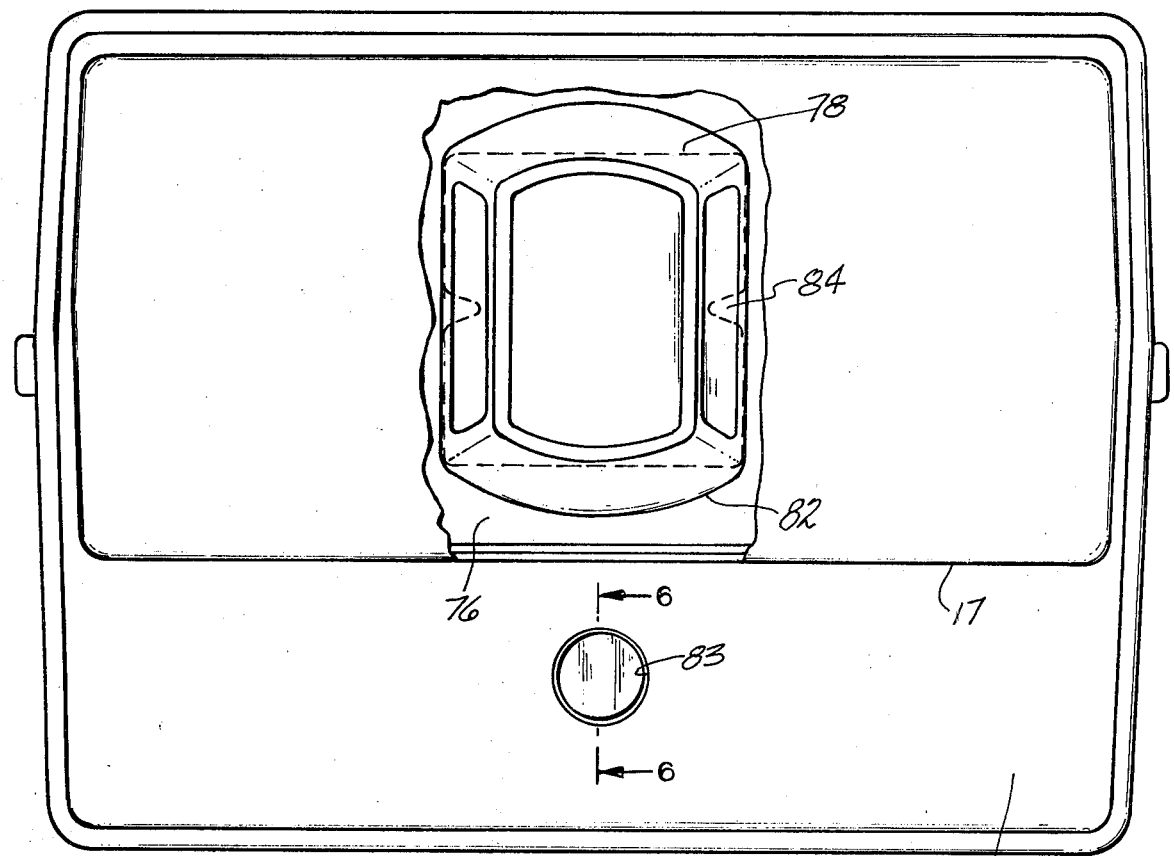
FIG. 5 is a top view of the pool feeder of FIG. 1.

Cartridge support 16, which is best seen by reference to FIG. 1 and FIG. 5, a top view of feeder 10, is an inverted box having a bottom 74 conforming to top 34 of housing 12, four vertical side walls and a horizontal top 76. Top 76 has three square cartridge openings 78, each adapted to receive a lower portion 80 of a cartridge 82 while supporting cartridge 82. Top 76 can also have an indicator well 83 for purposes described below. Tabs 84 are attached to top 76 and project into openings 78. Tabs 84 conform to vertical grooves 86 on the side of cartridges 82 to help limit movement of cartridges 82 within openings 78. An inverted box-shaped cartridge cover 17 is placed atop cartridge support 16 so as to cover openings 76 and help prevent debris from falling through openings 76 into dissolving chamber 28.

Figure 2:
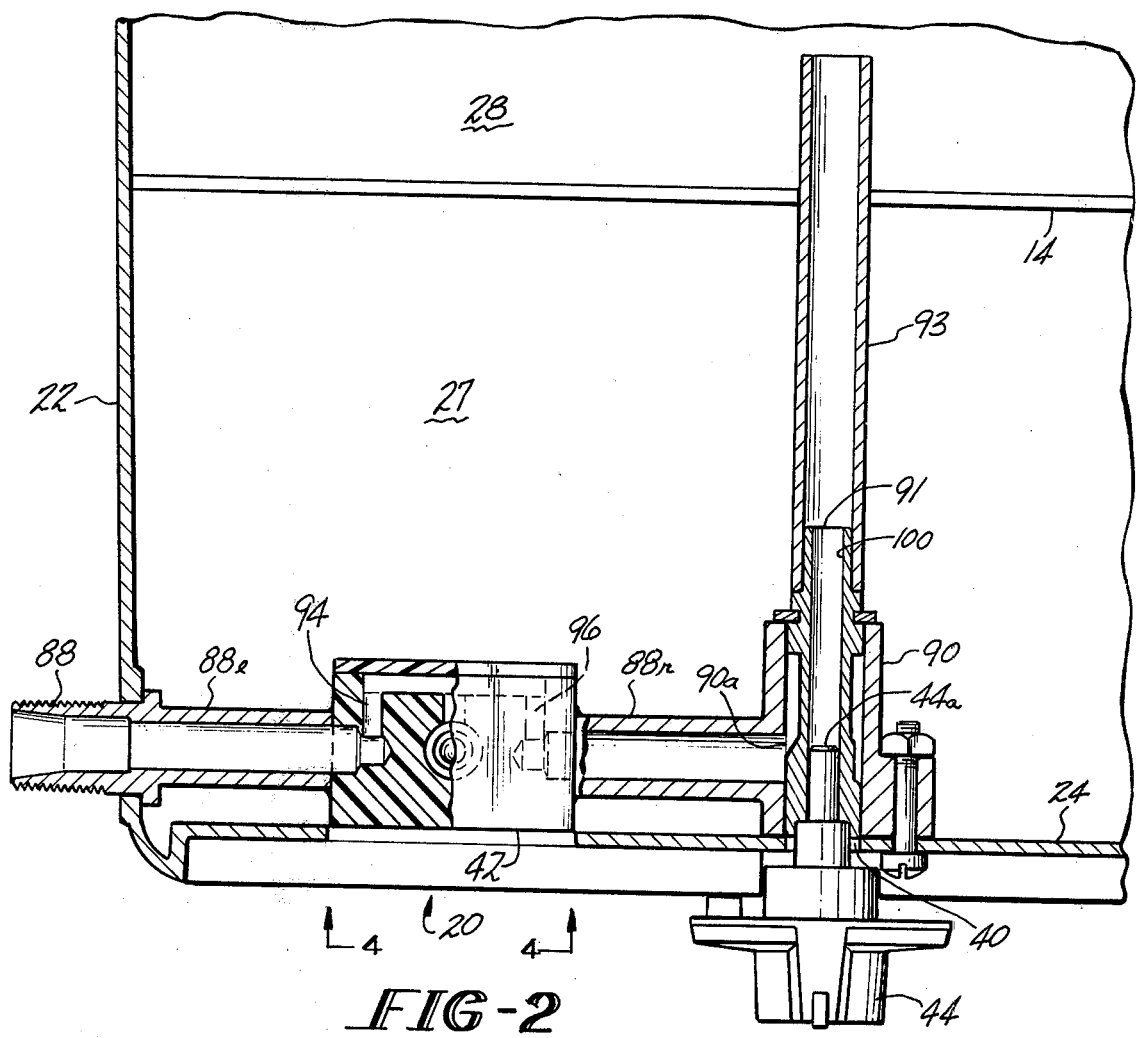
FIG. 2 is a horizontal cross-sectional view of the inlet valve means taken along lines 2—2 of FIG. 1.

Inlet valve assembly 20 is best seen in FIG. 2 which is a horizontal cross-sectional view taken along lines 2—2 of FIG. 1. Inlet valve assembly 20 comprises inlet conduit 88, flowmeter 42, water control valve body 90, water control knob 44, water control valve member 91 and dissolving chamber feed tube 93. Conduit 88 passes sealingly through left side wall 22 and passes, parallel to wall 14, through outlet chamber 27 to valve body 90. Flowmeter 42 is interposed between left and right portions 88l and 88r of conduit 88 to indicate flow rate of water through conduit 88.

Figure 4:
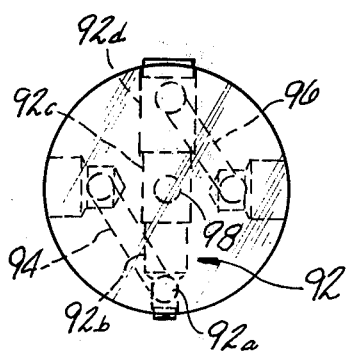
FIG. 4 is a front view of the flowmeter of FIG. 2.

Flowmeter 42 has a stepped vertical passageway 92 and is best seen in FIG. 4, a front view of flowmeter 42 of FIG. 1. Passageway 92 is connected at its lower end to portion 88l by a first diagonal passageway 94 and the top of passageway 92 is connected to portion 88r by a second diagonal passageway 96. Passageway 92 has four sections 92a–d of increasing diameter. The bottom section 92a has the smallest diameter and the top section 92d has the largest diameter. A ball 98 is placed in passageway 92 and assumes a position within passageway 92 which is indicative of the water flow rate through passageway 92. FIG. 2 shows the left side of flowmeter 42 diagonally sectioned along passageway 94 and the right side from above with passageway 96 shown in phantom. A suitable indicator (see FIG. 1) can indicate whether this water flow rate is high, normal, low or off depending on the position of ball 98 in passageway 92.

Conduit 88 intersects valve body 90 perpendicularly to form an entrance opening 90a and is preferably formed integral with valve body 90 by conventional plastic molding techniques. Valve body 90 cooperates with a valve member 91 contained by valve body 90. Valve member 91 is best seen with reference to FIG. 2 and FIG. 3.

Figure 3:
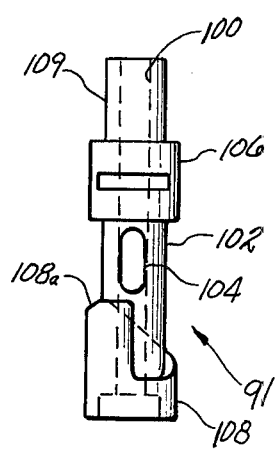
FIG. 3 is a view of the valve member of FIG. 2.

FIG. 3 is a top view of valve member 91 of FIG. 2. Valve member 91 comprises a central passageway 100, a recess 102, a valve port 104, a seal collar 106, a cammed seal collar 108 and tip 109. Passageway 100 is in continuous fluid communication with dissolving chamber 28 through dissolving chamber feed tube 93 and with recess 102 through valve port 104. Seal collar 106 and cammed seal collar 108 serve to dynamically seal recess 102 within valve body 90 so that water can only pass from recess 102 to passageway 100 through port 104 and does not leak from recess 102 into outlet chamber 27 or to the exterior of housing 12. Cammed seal collar 108 has an inclined or cammed annular upper portion 108a which covers a varying portion of opening 90a depending on the rotary position of control knob 44 which is attached to valve member 91. Control knob 44 lies coaxial to member 91 and has a reduced diameter plug section 44a which is adapted to pass through housing 12 and plug the front end of passageway 100 and prevent flow from passageway 100 to the exterior of housing 12. As control knob 44 is rotated a selected water flow rate is provided to dissolving chamber 28 and this flow rate is indicated by the position of ball 98 within passageway 92 of flowmeter 42. Feed tube 93 lies coaxial with valve member 91 and passes from valve member 91 orthogonally over wall 14. Tip 109 fits sealingly within the inlet end of feed tube 93, so that feed tube 93 rotates with member 91 and knob 44. Tube 93 can lie on wall 14 or be cantilevered from tip 109. Tube 93 could be affixed to body 90 instead of member 91.

The chlorine feed rate is dependent primarily upon the surface area of chlorine-containing chemical exposed to water and to a much lesser degree by the rate of movement of water past the chlorine-containing chemical for slow dissolving compounds such as a trichloroisocyanuric acid composition. Other pool treatment chemicals such as calcium hypochlorite, sodium dichloroisocyanurate or isocyanuric acid could be used. As seen in FIGS. 1 and 5, cartridges 82 are inserted into dissolving chamber 28 and held by support 16. This results in the chlorine-containing chemical within cartridge 82 being either above or below the water level in dissolving chamber 28. The cartridge 82 is provided with holes or slots (not shown) adjacent to or on the bottom 110 thereof to allow the water within dissolving chamber to enter the interior of cartridge 82 and contact the chlorine-containing material within cartridge 82. A vent opening (not shown) can also be provided at some location on cartridge 82 above the maximum level of water in dissolving chamber 28 to allow the water level in cartridge 82 to coincide with the water level in dissolving chamber 28. As slide member 48 is moved to the right, this water level is raised and the chlorine feed rate increases. Feeder 10 provides a single control knob 44 to set the treated water feed rate and a single slide control to set the chlorine feed rate.

Figure 6:
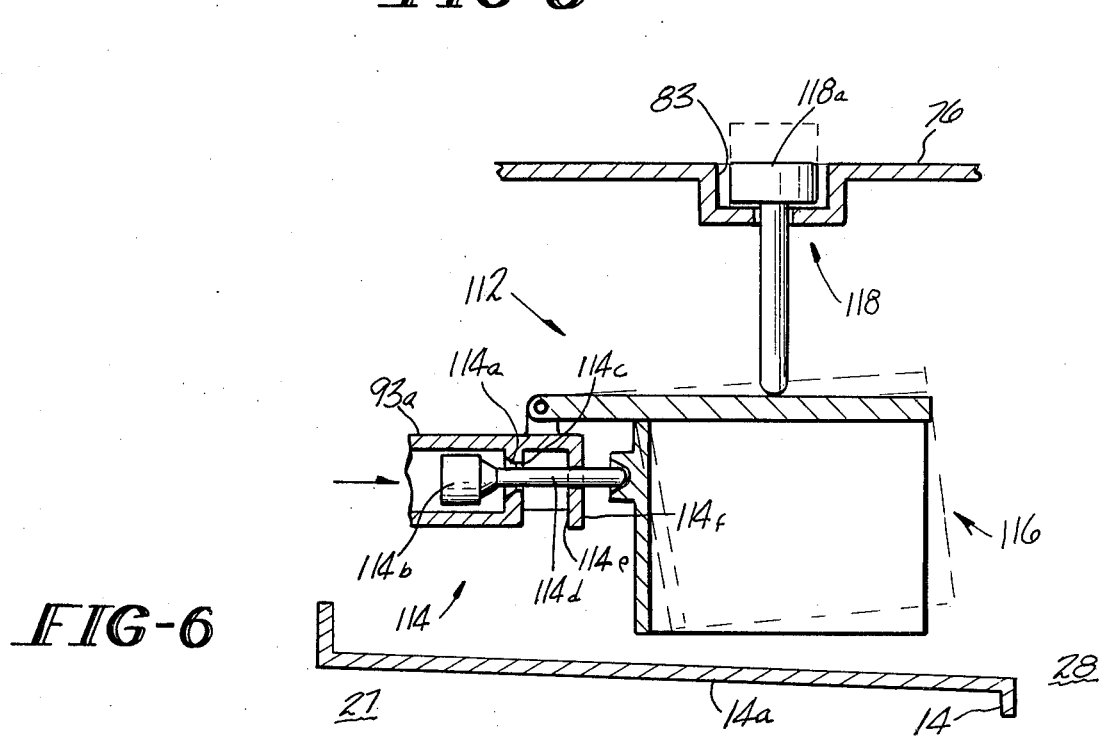
FIG. 6 is a vertical cross-sectional view taken along lines 6—6 of FIG. 5 showing a high water level shut-off valve and indicator for optional use with the feeder of FIG. 1.

Looking now to FIGS. 5 and 6, a vertical cross-section taken along lines 6—6 of FIG. 5 to show optional high water level indicator and shut-off valve assembly 112 is seen. Assembly 112 is not seen in FIG. 1 because it would lie in the removed portion of feeder 10. Assembly 112 comprises shut-off valve portion 114, float 116, indicator 118 and trough 14a. Portion 114 comprises a valve seat 114a, a valve member 114b, an opening 114c and a valve rod 114d and an outlet port 114e. Seat 114a is located at the rear end of a shortened feed tube 93a, affixed to valve body 90 rather than valve member 91, to allow assembly 112 to lie within and above outlet chamber 27, respectively, so as to not interfere with cartidges 82. Seat 114a is formed by an inner annular ledge in tube 93a with a central opening 114c through which rod 114d connected to valve member 114b passes. Valve member 114b has a rear surface conforming to seat 114a and seals opening 114c when rod 114d is moved rearwardly. Opening 114c leads to a downward opening outlet port 114e which in turn lies above a trough 14a which is attached to wall 14. The trough can be of any design which allows assembly 112 to lie within outlet chamber 27 and yet feed water to dissolving chamber 28. Rod 114d is connected through a deflector 114f to float 116. Float 116 is hinged at top front to tube 93a and rotates upwardly and rearwardly relative to tube 93 when water rises to a height sufficient to raise the float 116. As float 116 is so moved, rod 114d is pulled rearwardly to seat valve 114b on seat 114a. Due to the pressure differential across valve assembly 114 when closed, rod 114d must be pushed forward in order to move valve member 114b off seat 114a. This is done by pushing down on the top 118a of indicator 118 which in turn pushes float 116 downward and forward and thus moves rod 114d forward to reopen opening 114c. When float 116 is not floating, the top 118a of indicator 118 lies within indicator well 83 flush with top 76. When float 118 is floated upward, top 118a of indicator 118 rises above top 76 of support 16 to provide a readily visible external indication that automatic shut-off has occurred. Fluid inflow to feeder 10 thus remains shut off until an operator notices the high water indicator and pushes down top 118a. At such time it is expected that the operator will check to see what is causing the high water problem and correct that cause before reactivating feeder 10.

Water level in chamber 28 is controlled by the level of first end 30. Water from chamber 28 flows into second end 56 of tube 31 from dissolving chamber 28 and out of first end 30 into outlet chamber 27 when end 30 is below the water level of dissolving chamber 28.

Chlorine-depleted water can be supplied to conduit 88 from a swimming pool. Feeder 10 then enriches the chlorine-depleted water with additional chlorine from the chemicals in cartridge 82 and this chlorine-enriched water is returned to the swimming pool through outlet conduit 64. Feeder 10 can be installed at any desired point in the flow path of a conventional filtration system, if desired so that feeder 10 and the filtration unit are simultaneously actuated, feeder 10 being separately controllable via knob 44 and slide member 48. Water can be supplied to feeder 10, if desired, from a separate source.

While feeder 10 can be sized to provide any feed rate, this feeder 10 is preferably designed to provide and maintain a chlorine residual level within the range of 1.0–3.0 ppm by feeding 0–18 oz. of material per day.

While three cartridges 82 are preferred, only at least one is required for the invention. With a plurality of cartridges, there can be different combinations of treatment chemicals depending on the particular water being treated by feeder 10.

Also, in place of slide member 48 and link member 50, a rotatable adjustment body (not shown) such as a rotary spool knob, projecting externally of the feeder housing and a flexible connector, such as a chlorine resistant strap, attached at opposite ends to the rotatable adjustment body and to the first end 30 of control tube 31 could be used to raise and lower end 30 responsive to rotation of the rotatable adjustment body.

The optional assembly 112 automatically overrides inlet valve assembly 20 and prevents flow of water from said inlet valve means into said dissolving chamber when said height of water in said dissolving chamber exceeds a predetermined level indicative of a cessation of solution overflow from conduit 64 while simultaneously giving an external readily visible indication that automatic shut-off has occurred and providing an easily accessible reset button for reopening said flow to said dissolving chamber when the condition responsible for cessation of solution outflow has been corrected. Feed tube 93a is attached to valve body 90 so as to allow valve member 91 to rotate without rotating assembly 112.

The length of tube 31, arm 50 and length of movement of slide control 48 are preferably selected to approximate a linear relationship between the effective water level in the dissolving chamber and the reading on scale 52 indicative of that level. For example, the distance of slide member from the left or zero end of scale 52 could equal the water level in chamber 28.

Wall 14 is preferably lower than the "outer walls", sides 22–25, and lower than openings 38 and 40, if openings 38 and 40 are not sealed, so as to allow water to exit through outlet valve assembly 18 rather than openings 38 and 40 if control tube 30 became blocked.

If it is desired to install feeder 10 below the water level of a body of water connected to outlet conduit 64, a check valve is added between conduit 64 and the body of water so as to prevent "backflow" into feeder 10 through outlet valve assembly 18.

A "weep hole" (not shown) could be provided in wall 14, seal 58 or tube 30 to allow dissolving chamber 28 to drain very slowly to below the bottom 110 of cartridges 82 if water supply to dissolving chamber 28 is shut-off and first end 30a remains elevated to prevent supersaturation of water in chamber 28 during such shut-off and possible damage to pool and equipment resulting therefrom.

While a preferred embodiment of the invention has been described above, many simple modifications, such as the rotary knob and strap above described, will occur to the ordinarily skilled artisan without departing from the invention. The following claims are to be read so as to include and cover such minor modifications.

What is claimed is:

1. Apparatus for dispensing and dissolving soluble water treatment materials, comprising:
   (a) a housing having an upper inlet opening adjacent a top thereof and a lower outlet opening adjacent a bottom thereof;
   (b) vertical wall means, within said housing, for dividing said housing into an outlet chamber and dissolving chamber side by side with said outlet chamber;
   (c) control tube means having:
      (i) a first outlet end indirectly supported within said outlet chamber by said housing and fluidly communicating with said outlet chamber at a vertically adjustable height above the level of a bottom of said dissolving chamber;
      (ii) a second inlet end rotatably supported by said wall means and communicating with said dissolving chamber adjacent but slightly above said bottom of said dissolving chamber; and
      (iii) a tube portion within said outlet chamber communicating said first and second ends, for controlling the maximum height of water in said dissolving chamber;

(d) support means, attached to said housing, for supporting and holding at least one cartridge containing said soluble material to be dissolved with the lower end of said cartridge disposed in said dissolving chamber immersed to a depth determined by said adjusted height of said first end of said control tube means;

(e) outlet valve assembly means, for automatically allowing fluid communication between said lower outlet opening and said outlet chamber only when said outlet chamber contains a treated water to a height above said lower outlet opening; and (f) inlet valve assembly means, for allowing an adjustable selected volume flow rate of water from said upper inlet opening into said dissolving chamber.

2. The apparatus of claim 1, further comprising high water level shut-off valve means for preventing flow of water from said inlet valve means into said dissolving chamber, said shut-off valve means being automatically activated when said height of water in said dissolving chamber exceeds a predetermined level indicative of a cessation of solution outflow from the apparatus; and an indicator button means for automatically moving to a position visible from outside said housing when said water level in said dissolving chamber exceeds said predetermined level.

3. The apparatus of claim 1 wherein:
(a) said outlet chamber has an exterior sidewall which has at least one unsealed, unvalved opening therethrough; and
(b) said vertical wall means is lower than said housing top and lower than said unsealed opening.

4. The apparatus of claim 1 wherein said inlet valve means includes a vertical stepped-tube flow indicator.

5. The apparatus of claim 4 wherein said inlet valve means comprises:
(a) a first passageway within said outlet chamber in communication with said inlet opening through said flow indicator;
(b) a second cylindrical passageway within said outlet chamber intersecting said first passageway at right angles; and
(c) a cylindrical rotary valve plug, within said second cylindrical passageway, having an axially inclined annular portion adapted to cover a rotatably variable portion of said intersecting first passageway to thereby regulate flow through said inlet valve.

6. The apparatus of claim 1 wherein:
(a) said side by side dissolving chamber and outlet chamber each have a rectangular horizontal cross-section including two short side walls, one long wall and said wall means; and (b) said inlet opening and said outlet opening are both located on a short side wall of said outlet chamber.

7. The apparatus of claim 1 wherein said inlet valve means comprises:
(a) a first passageway extending parallel to said wall means and lying within said outlet chamber,
(b) a second passageway communicating perpendicularly with said first passageway and extending orthogonally over said wall means and into said dissolving chamber; and
(c) a rotary valve means, at the intersection of said first and second passageways, for regulating flow through said passageways.

8. The apparatus of claim 1 wherein said first end and said tube portion lie wholly within said outlet chamber and said second end passes through said wall means adjacent said bottoms of said outlet and dissolving chamber and into said dissolving chamber so as to receive treated water from said dissolving chamber and supply said fluids to said outlet chamber when said height of treated water in said dissolving chamber exceeds the height of said first end above said bottom of said housing.

9. The apparatus of claim 8 wherein said outlet valve means comprises a float within said outlet chamber and a valve connected to said float.

10. The apparatus of claim 1 wherein said inlet valve assembly, outlet valve assembly and control tube means are located within said outlet chamber so as to provide an unobstructed dissolving chamber to thereby maximize the amount of water treatment materials that may be placed in a dissolving chamber of a limited size to increase the chlorine dispensing capacity of such dissolving chamber.

11. The apparatus of claim 1 having at least two of said cartridges, each of said cartridges containing chemicals of a different chemical composition.

12. The apparatus of claim 11 having at least three of said cartridges, at least one of said cartridges containing a different chemical from the other two cartridges.

13. The apparatus of claim 1 wherein said control tube means includes a horizontal slide control system which comprises:
(a) a horizontal adjustable slide member slidably supported by said housing and projecting externally from said housing; and
(b) a rigid link member connecting said first end of said control tube means to said slide member, said link member being of such length that a given horizontal movement of said horizontal slide member by a certain length will yield a change in the height of water in said dissolving chamber by about the same length.

* * * * *